US009550867B2

(12) United States Patent
Ohno et al.

(10) Patent No.: US 9,550,867 B2
(45) Date of Patent: Jan. 24, 2017

(54) FINE-DISPERSION COMPOUNDING APPARATUS AND FINE-DISPERSION COMPOUNDING METHOD

(71) Applicants: SANWA Co., Ltd., Sakai-shi (JP); Hokuto Kogyo Co., Ltd., Shari-gun (JP)

(72) Inventors: Takashi Ohno, Sakai (JP); Toshifumi Yamada, Shari-gun (JP)

(73) Assignees: SANWA Co., Ltd., Sakai-shi (JP); Hokuto Kogyo Co., Ltd., Shari-gun (JP)

( * ) Notice: Subject to any disclaimer, the term of this patent is extended or adjusted under 35 U.S.C. 154(b) by 0 days.

(21) Appl. No.: 15/158,931

(22) Filed: May 19, 2016

(65) Prior Publication Data

US 2016/0340475 A1    Nov. 24, 2016

(30) Foreign Application Priority Data

May 21, 2015    (JP) ................... 2015-103813

(51) Int. Cl.
*B01F 13/10*    (2006.01)
*C08J 3/20*    (2006.01)
(Continued)

(52) U.S. Cl.
CPC .............. *C08J 3/20* (2013.01); *B01F 7/00133* (2013.01); *B01F 7/00816* (2013.01);
(Continued)

(58) Field of Classification Search
CPC ............ B29B 7/428; B29B 7/488; B29B 7/94; B29C 47/1063; B01F 13/103; B01F 13/1025; B01F 13/1027; B01F 13/1033; B01F 13/1036; B01F 13/1038; B01F 7/00133; B01F 13/10; B01F 2013/1052
(Continued)

(56) References Cited

U.S. PATENT DOCUMENTS 3,296,043 A * 1/1967 Fluke
6,367,960 B2 * 4/2002 Yamazaki
(Continued)

FOREIGN PATENT DOCUMENTS

JP    2006-289164    10/2006
JP    4660528    3/2011
(Continued)

*Primary Examiner* — Charles Cooley
(74) *Attorney, Agent, or Firm* — Oblon, McClelland, Maier & Neustadt, L.L.P.

(57) ABSTRACT

In one embodiment, a fine-dispersion compounding apparatus includes a closed container into which solid material is fed; a boiler configured to introduce high-pressure steam into inside of the closed container; a rotating body configured to knead the solid material with liquid medium generated from condensed high-pressure steam by rotating inside the closed container; an open port configured to set internal pressure of the closed container to atmospheric pressure level by releasing a closed state of the closed container; a conveying port configured to convey kneaded mixture of the solid material and liquid medium from inside to outside of the closed container; a mixed dispersion unit configured to disperse the conveyed kneaded mixture and compounding material; a liquid-medium ejection unit configured to eject the liquid medium contained in the kneaded mixture; and an extraction unit configured to extract a composite compound of the compounding material and the solid material.

4 Claims, 3 Drawing Sheets (51) Int. Cl.
*C08J 3/03* (2006.01)
*C08J 3/18* (2006.01)
*B01F 7/00* (2006.01)

(52) U.S. Cl.
CPC ............ *B01F 13/1027* (2013.01); *C08J 3/03* (2013.01); *C08J 3/18* (2013.01); *B01F 2013/1052* (2013.01); *C08J 2397/02* (2013.01)

(58) Field of Classification Search
USPC ...... 366/9, 76.1–76.93, 79–90, 158.5, 181.5, 366/182.4, 168.1, 172.1, 172.2, 301, 323, 366/339, 181.6, 83–85, 88; 425/200–209
See application file for complete search history.

(56) References Cited

U.S. PATENT DOCUMENTS 9,272,468 B1 * 3/2016 Ileleji
2016/0135449 A1 * 5/2016 Ileleji

FOREIGN PATENT DOCUMENTS

JP 5481623 4/2014
WO 2014/092648 A1 * 6/2014

\* cited by examiner

FINE-DISPERSION COMPOUNDING APPARATUS AND FINE-DISPERSION COMPOUNDING METHOD

CROSS-REFERENCE TO RELATED APPLICATION

This application is based upon and claims the benefit of priority from Japanese Patent Application No. 2015-103813, filed on May 21, 2015, the entire contents of which are incorporated herein by reference.

FIELD

The present invention relates to technology of manufacturing composite compound by performing fine dispersion on solid material.

BACKGROUND

Biomass (bioresource) is originally generated by taking in carbon dioxide from the atmosphere. Thus, biomass is a carbon-neutral resource in that carbon dioxide concentration in the atmosphere is not increased or decreased in the case of being combusted, which is different from the case of combusting a fossil fuel. Hence, research for using such carbon-neutral biomass is currently advanced.

Biomass-derived components such as cellulose, chitin, protein, and terpenoid include functional groups which are appropriate for binding with functional groups of other compounds such as a hydroxyl group, a phenolic group, a mercapto group, an amino group, a carboxyl group, and a double bond.

Thus, there is a great expectation in an attempt to modify biomass under a chemical reaction for creating a novel product which develops high functionality.

In order to effectively achieve the above-described attempt, it is required that an intended chemical reaction in biomass-derived components proceeds evenly and rapidly as a whole.

However, solid-phase biomass has high crystallinity and aggregated structure including, e.g., a three-dimensional cross-link for keeping biological functions. Thus, there is a concern that approach of a reaction reagent to functional groups of biomass-derived components may be prevented and homolytic chemical reaction may be inhibited.

For the above reason, when a product using biomass as its material is manufactured, improvement of reactivity and dispersibility is attempted by performing pulverization processing of degrading aggregated structure of biomass in a process of reacting biomass with various types of reagents and/or compounding or in its preceding process (e.g., refer to the following Patent Documents 1 to 3).

[Patent Document 1] Japanese Unexamined Patent Application Publication No. 2006-289164
[Patent Document 2] Japanese Patent No. 4660528
[Patent Document 3] Japanese Patent No. 5481623

The Patent Document 1 discloses technology of obtaining homogeneous suspension liquid by (a) mixing biomass with a solvent using a high-pressure homogenizer and (b) micronizing the mixed biomass by actions of the high-pressure homogenizer such as shear pulverization, collisional destruction, cavitation destruction, and pressure to disperse the micronized particles of biomass into the solvent.

However, one operation of the above-described process using a homogenizer does not have a sufficient effect of degrading aggregated structure, and plural times of operations are sometimes required. Further, the above-described process using a homogenizer has a problem of inefficiency because it consumes a great amount of solvent.

The Patent Document 2 discloses technology of obtaining suspension in which biomass is finely dispersed into an organic solvent, by (a) feeding biomass and the organic solvent into a temperature-adjustable closed container and (b) kneading them under high temperature and high pressure to degrade aggregated structure of the biomass.

However, it takes a long time to set the biomass and the solvent at normal temperature and normal pressure to intended temperature and intended pressure, and a great amount of energy is lost in it. Thus, it has problems of low-productivity and high manufacturing cost.

Additionally, if kneading time is prolonged in order to improve the effect of degrading aggregated structure, it causes another problem of reducing molecular mass of biomass.

The Patent Document 3 discloses technology of manufacturing composite compound by (a) performing heat treatment on woody material, which has been subjected to a mechanically dry grinding process, with water vapor to attenuate crystalline bonding strength under hydrolysis and then (b) mixing the resultant woody material with resin.

However, grain size of the woody material composing the manufactured composite compound is determined depending on the grinding process. Thus, there is a problem that to form homogeneous and fine disperse phase is difficult in the case of large grain size and the strength of the composite compound is degraded due to reduction in molecular mass in the case of small grain size.

SUMMARY OF THE INVENTION

The present invention has been worked out in consideration of the above-described backgrounds. The present invention aims to provide fine-dispersion compounding technology to reduce energy and a solvent to be used, degrade aggregated structure while suppressing reduction in molecular mass of solid material, and manufacture composite compound in which this solid material is finely dispersed into compounding material.

In one embodiment of the present embodiment, a fine-dispersion compounding apparatus includes:
a closed container into which biomass is fed as solid material;
a boiler configured to introduce high-pressure steam into inside of the closed container;
a rotating body configured to
(a) rotate inside the closed container,
(b) knead the solid material with liquid medium generated from the high-pressure steam being condensed, and
(c) degrade aggregated structure of the solid material by plasticizing action resulting from latent heat of the high-pressure steam and kinetic energy of rotation thereof;
open ports configured to
(a) include a first port emitting steam containing corrosive gas generated by being separated from the solid material in a beginning of a kneading process to outside of the closed container and a second port emitting steam, whose concentration of corrosive gas is reduced from steam emitted from the first port, to outside of the closed container by being switched from the first port, and (b) set internal pressure of the closed container to atmospheric pressure level by releasing a closed state of the closed container;

a conveying port configured to convey kneaded mixture of the solid material and the liquid medium from inside to outside of the closed container;

a first retaining unit configured to retain the kneaded mixture conveyed from inside to outside of the closed container;

a second retaining unit configured to retain compounding material to be compounded with the kneaded mixture;

a mixed dispersion unit configured to
  (a) include a cylinder capable of setting temperature of an inner periphery thereof and a screw rotating inside of the cylinder, and
  (b) disperse the kneaded mixture and the compounding material into each other while extruding the kneaded mixture and the compounding material in one direction under preset temperature at which the compounding material is fluidized in a closed condition;

a liquid-medium ejection unit configured to
  (a) communicate a closed inside of the cylinder with outside of the cylinder whose pressure is set to a value lower than pressure of the closed inside, and
  (b) eject the liquid medium contained in the kneaded mixture to outside; and an extraction unit configured to extract a composite compound of the solid material forming a dispersing phase by losing the liquid medium and being finely dispersed and the compounding material forming a matrix phase by being fluidized, to outside of the mixed dispersion unit.

According to the present invention, fine-dispersion compounding technology to reduce energy and a solvent to be used, degrade aggregated structure while suppressing reduction in molecular mass of solid material, and manufacture composite compound in which this solid material is finely dispersed into compounding material is provided.

DETAILED DESCRIPTION

Hereinafter, embodiments of the present invention will be described with reference to the accompanying drawings.

Figure 1:
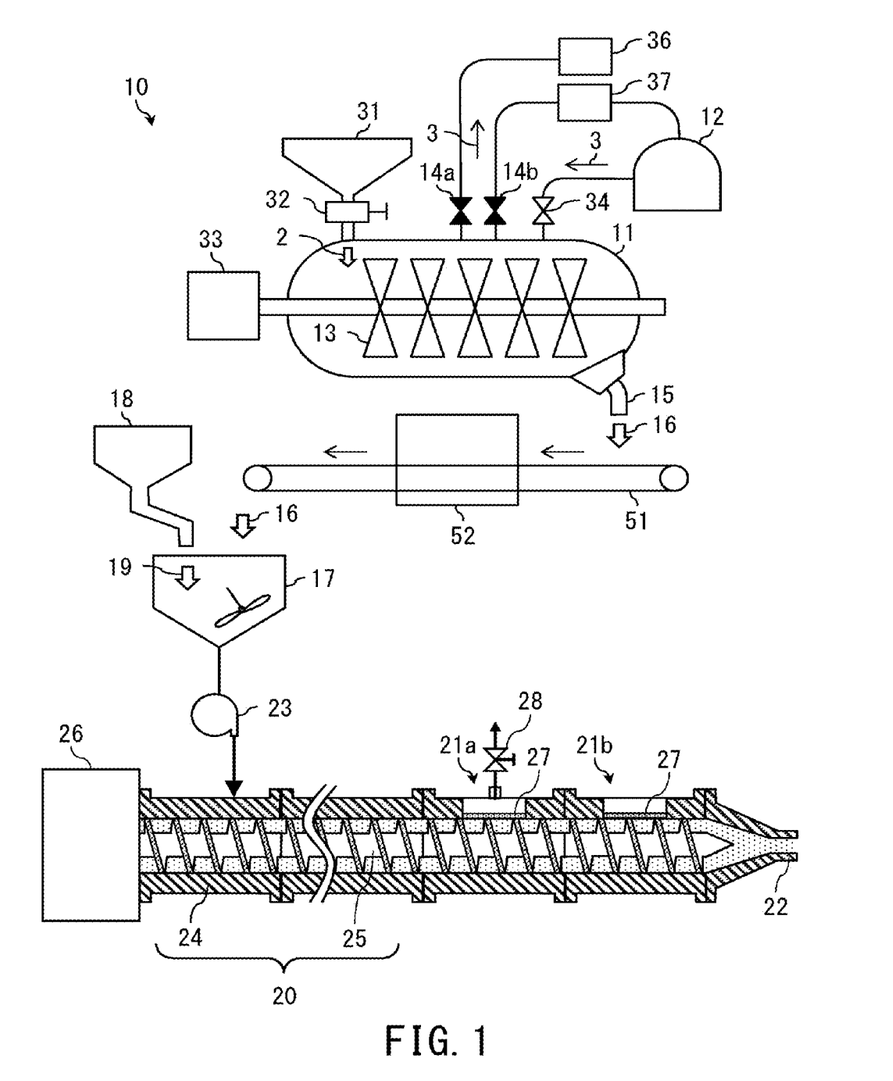
FIG. 1 illustrates overall configuration of the fine-dispersion compounding apparatus according to an embodiment of the present invention.

As shown in FIG. 1, a fine-dispersion compounding apparatus 10 of the present embodiment includes a closed container 11, a boiler 12, a rotating body 13, open ports 14 (14a and 14b), and a taking-out port 15. Here, a solid material 2 is fed into the closed container 11. The boiler 12 introduces high-pressure steam 3 into inside of the closed container 11. The rotating body 13 rotates inside the closed container 11 so as to knead the solid material 2 with liquid medium which is generated from the high-pressure steam 3 after being condensed. The open ports 14 (14a and 14b) set the internal pressure of the closed container 11 to the atmospheric pressure level by opening the closed condition of the closed container 11. The taking-out port 15 takes out kneaded mixture 16 of the solid material 2 and the liquid medium generated from the condensed high-pressure steam 3 from inside of the closed container 11 to its outside.

The fine-dispersion compounding apparatus 10 further includes a first retaining unit 17, a second retaining unit 18, a mixed dispersion unit 20, a liquid-medium ejection units 21 (21a and 21b), and an extraction unit 22. The first retaining unit 17 retains the kneaded mixture 16 taken out from inside of the container 11 to its outside. The second retaining unit 18 retains compounding material 19 to be compounded with the kneaded mixture 16. The mixed dispersion unit 20 mixes the kneaded mixture 16 with the compounding material 19 under preset temperature and a closed condition so as to disperse the kneaded mixture 16 and the compounding material 19 into each other. The liquid-medium ejection units 21 (21a and 21b) communicate the closed inside of the mixed dispersion unit 20 with its outside whose pressure is set to a value lower than the pressure of the closed inside, and eject the liquid medium included in the kneaded mixture 16 to the outside. The extraction unit 22 extracts composite compound of the compounding material 19 and the solid material 2 from which the liquid medium is eliminated, to outside of the mixed dispersion unit 20.

A hopper 31 configured to contain the solid material 2 is connected to the closed container 11. Only one batch of the solid material 2 is fed into inside of the closed container 11 by operating an on-off valve 32.

Biomass which is a renewable organic resource out of growing animals and plants is preferably used for this solid material 2.

Specifically, vegetation biomass whose principal component is lignocellulose or cellulose (e.g., some waste materials from the lumber industry and the pulp industry such as thinned wood material and construction demolished material, and some agricultural waste material such as rice straws, husks, and rice hulls) and chitinous (or chitosan) biomass which originates from crustaceans such as crab shells and lobster shells may be used for the solid material 2.

Additionally, the solid material 2 is not limited to such biomass. For example, the fine-dispersion compounding apparatus 10 can be used for recycle of synthetic macromolecular compound-material such as FRP (Fiber Reinforced Plastics).

The boiler 12 is capable of supplying 50 kg or more of water vapor (high-pressure steam 3), whose pressure per 1 $m^3$ is 1.5 MPa or more, per hour. The boiler 12 is also capable of adjusting its supply pressure within the range from 1.5 MPa to 2.4 MPa.

The high-pressure steam 3 supplied into inside of the closed container 11 from the boiler 12 emits its latent heat and condensed into liquid medium. This condensed liquid medium infiltrates into the solid material 2 to plasticize the solid material 2, while the temperature of the solid material 2 is increased by the emitted latent heat, which promotes the plasticization.

Incidentally, the high-pressure steam 3 supplied into inside of the closed container 11 is not limited to water vapor. Any appropriate steam, which emits its latent heat and changes into liquid medium by being condensed so that the changed liquid medium plasticize the solid material 2, can be used for the high-pressure steam 3.

At the timing when predetermined amount of the high-pressure steam 3 is supplied from the boiler 12 or the internal pressure of the closed container 11 reaches a predetermined value, the on-off valve 34 of the boiler 12 is switched from the open-state to the closed-state.

The rotating body 13 rotates inside the closed container 11 under the control of the rotation driving unit 33 so as to knead the solid material 2 plasticized by the condensed liquid medium of the high-pressure steam 3 and degrade its aggregated structure by thermal energy and kinetic energy.

Figure 2:
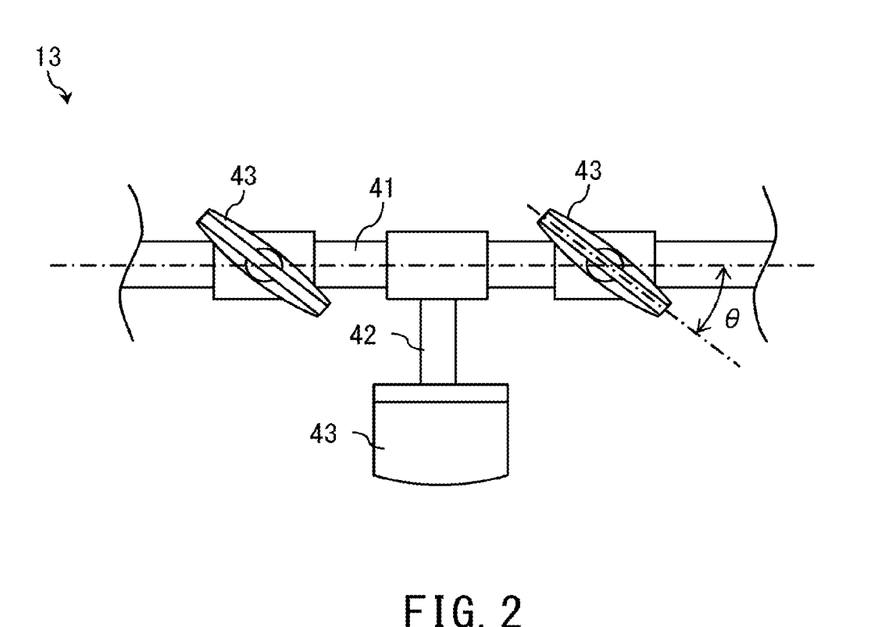
FIG. 2 is a partially enlarged view of a rotating body applied to the fine-dispersion compounding apparatus of one embodiment.

As shown in FIG. 2, the rotating body 13 includes a shaft 41, at least three rods 42, and at least three fins 43. The shaft 41 rotates on a predetermined axis. One end of each of the three or more rods 42 is disposed on the shaft 41, and each of these rods 42 extends along the direction perpendicular to the axial direction of the shaft 41. The number of fins 43 is, for example, the same as the rods 42, and each of the fins 43 is disposed on the tip of each of the rods 42 so that the torsional angle of the principal surface of each of the fins 43 becomes 40° to 60° with respect to the axial direction of the shaft 41.

When the rotating body 13 configured as above rotates, the rotating body 13 promotes degradation of the aggregated structure of the solid material 2 by repeating the following process. That is, the rotating body 13 sends the solid material 2 along the inner periphery of the closed container 11 in the axial direction of the shaft 41 while kneading this solid material 2, and turns back along the shaft 41 when it reaches the end.

The open ports 14 (14a and 14b) at the closed state put the closed container 11 into the closed state. When the open ports 14 (14a and 14b) turn to the open state, the open ports 14 (14a and 14b) release the closed state of the closed container 11. These open ports 14 are set to the closed state during the process of supplying the high-pressure steam 3 from the boiler 12 and the process of rotating the rotating body 13.

Then, as the temperature of the kneaded mixture 16 increases due to thermal energy converted from the kinetic energy of the rotating body 13 in association of promotion of the kneading process, the internal pressure of the rotating body 13 also increases.

Additionally, when the solid material 2 is woody material, a great amount of strong acid such as wood vinegar is generated in the beginning of the kneading process.

Thus, in order to protect the closed container 11 from the excessive pressure and/or the corrosion due to generated gas, the open ports 14 are sometimes turned to the open state so as to release the closed state at an appropriate timing in the kneading process.

For this reason, the open ports 14 include the first port 14a and the second port 14b. The first port 14a emits steam including corrosive gas, which is generated by being separated from the solid material 2 in the beginning of the kneading process, to outside of the closed container 11. The second port 14b emits the steam to outside of the closed container 11 by being switched from the first port 14a.

The first recovery unit 36 configured to cool down the corrosive gas so as to condense it into liquid and recover the condensed liquid is disposed at the terminal of the first port 14a. The second recovery unit 37 configured to cool down the high-pressure steam 3 so as to condense it into liquid and recover the condensed liquid is disposed at the terminal of the second port 14b.

The second recovery unit 37 has a function of separating and recovering components of the corrosive gas included in the liquefied high-pressure steam 3 and a function of neutralizing these components of the corrosive gas by feeding chemical agents. The liquid medium separated and recovered by the second recovery unit 37 can be reused by returning it to the boiler 12.

As described above, by providing the first port 14a exclusively for emitting the corrosive gas to outside, duration of the second port 14b can be prolonged and total maintenance cost can be reduced.

The kneading process in the closed container 11 is promoted by appropriately repeating introduction of the high-pressure steam 3 from the boiler 12 and ejection of the high-pressure steam 3 from the open ports 14.

Then, at the timing when kneading of the solid material 2 with the liquid medium is sufficiently promoted, the kneaded mixture 16 is taken out from the taking-out port 15 to outside of the closed container 11.

As to the process of taking out the kneaded mixture 16 from the taking-out port 15, it is performed by rotating the rotating body 13 at low speed to send the kneaded mixture 16 towards the taking-out port 15, while the internal pressure of the closed container 11 is set to the atmospheric pressure level in advance by turning the open ports 14 to the open state.

The kneaded mixture 16 taken out from the taking-out port 15 is in a paste state, and conveyed by a conveying means 51 such as a belt conveyer to be sent to a dryer 52 which adjusts amount of the liquid medium contained in the kneaded mixture 16.

The amount of liquid medium contained in the kneaded mixture 16 to be adjusted by this dryer 52 is appropriately determined depending on requirements of the subsequent process in which the finely dispersed solid material 2 is used as a primary material. In terms of workability and preventing the finely dispersed solid material 2 from being blown up, in some cases, the kneaded mixture 16 preferably has such humidity degree that the liquid medium contained in the kneaded mixture 16 is not separated by gravity.

Since the fine-dispersion compounding apparatus 10 is configured as described above, liquid medium and energy to be used can be reduced by providing the high-pressure steam 3 with liquid medium and heat necessary for degrading the aggregated structure of the solid material 2. Further, fine dispersion of solid material can be achieved while suppressing reduction in its molecular mass.

The kneaded mixture 16 whose amount of the liquid medium is adjusted is retained by the first retaining unit 17, and is continuously subjected to the subsequent process of manufacturing the composite compound. Incidentally, this kneaded mixture 16 is sometimes packaged for preservation and its stock is managed.

In the vicinity of the upper aperture of the first retaining unit 17, the second retaining unit 18 configured to retain the compounding material 19 to be compounded with the accommodated kneaded mixture 16 is provided. This compounding material 19 is mixed with the finely dispersed particles of the solid material 2 so as to form a composite compound.

In this composite compound, the compounding material 19 forms a matrix phase and the finely dispersed particles of the solid material 2 form a dispersing phase. In terms of material characteristics of the composite compound, it is desirable that the solid material 2 is finely and homogeneously dispersed into the matrix phase of the compounding material 19.

For example, any of (a) thermoplastic resin which melts by heat, (b) thermo-setting resin which hardens by heat, and (c) photocurable resin which hardens by being irradiated with light may be used for the compounding material 19 forming such a matrix phase, and material which flows by being set to normal temperature or predetermined temperature is used for the compounding material 19.

As thermoplastic resin, polyolefin-based resin such as low density polyethylene (LDPE), high density polyethylene (HDPE), polypropylene (PP), ethylene-vinyl acetate copolymer (EVA), ethylene-ethyl acrylate copolymer (EEA) which are formed in pellet form is desirable.

Note that the thermoplastic resin used in the present embodiment is not limited to the above-described examples. Substances which have a property of being thermally fluidized by heat and can be subjected to extrusion molding in general such as polycarbonate resin (PC), polyethylene terephthalate resin (PET), acrylonitrile-butadiene-styrene copolymer (ABS), polyvinyl chloride (PVC), polystyrene (PS), and polyamide (PA) may be used for the thermoplastic resin in the present embodiment without restrictions in particular.

Additionally, as the compounding material 19, a reaction reagent which chemically modifies at least one of a hydroxyl group, a phenolic group, a mercapto group, an amino group, and a carboxyl group of biomass (solid material 2) is included.

Moreover, the compounding material 19 includes higher alcoholic lubricant, aliphatic amide lubricant, and ester series lubricant in addition to lubricant which improves fluidity of the finely dispersed solid material 2 such as hydrocarbon series including liquid paraffin and fatty acid including stearic acid.

These components of the compounding material 19 are mixed with the kneaded mixture 16 of the finely dispersed solid material 2 in the first retaining unit 17 so that combination ratio between each component of the compounding material 19 and the kneaded mixture 16 becomes a predetermined rate, and then the mixture of the compounding material 19 and the kneaded mixture 16 is fed into the mixed dispersion unit 20 by power of the pump 23.

Although an example in which the kneaded mixture 16 of the finely dispersed solid material 2 is mixed with the compounding material 19 in advance of being fed is shown as a method of feeding the kneaded mixture 16 of the finely dispersed solid material 2 into the mixed dispersion unit 20, the kneaded mixture 16 and the compounding material 19 are separately fed in some cases.

Additionally, though an example in which the kneaded mixture 16 is conveyed via the conveying means 51 and subjected to drying treatment by the dryer 52 is shown, such conveying means 51 and drying treatment may be omitted by directly feeding the kneaded mixture 16 into the mixed dispersion unit 20 from the closed container 11.

The mixed dispersion unit 20 includes a cylinder 24 and a screw 25. The cylinder 24 can set temperature of its inner periphery. The screw 25 penetrates inside of the cylinder 24 and rotates on the central axis of the cylinder 24 under the control of the driving unit 26 disposed at the end of the cylinder 24. The mixed dispersion unit 20 mixes the kneaded mixture 16 with the compounding material 19 under the closed state and preset temperature so that both are dispersed into each other.

The cylinder 24 is sorted into (a) a feed zone into which raw material (i.e., the kneaded mixture 16 and the compounding material 19 in this case) is fed, (b) a heat mixing zone in which the respective components of the fed raw material are mixed with each other by heat, (c) a liquid-medium ejection zone in which the liquid-medium contained in the mixture is vaporized and ejected from the liquid-medium ejection units 21 (21a and 21b), and (d) a metering zone in which the mixture in a melt state is adjusted so as to be extruded from the extraction unit 22 with constant pressure and constant amount, in the order from the side of the driving unit 26.

In the cylinder 24, non-illustrated heaters are provided at respective zones excluding the feed zone. The respective zones of the cylinder 24 are controlled to appropriate temperature by these heaters.

The mixture in a fluid state is extracted from the extraction unit 22 disposed at the most downstream portion of the cylinder 24, then coagulated bypassing through a non-illustrated cooling bath, and then cut into rice-grain-like pellets by a non-illustrated pelletizer.

Spiral flights are formed around the axis of the screw 25, and the driving unit 26 disposed at the end of the screw 25 causes the screw 25 to rotate on its axis. Since the kneaded mixture 16 and the compounding material 19 receive pressure from the flights due to the above-described structure of screw 25, the kneaded mixture 16 and the compounding material 19 are mixed with each other and the mixture of both are extruded in the direction from the upstream to the downstream of the cylinder 24.

In the liquid-medium ejection zone, the liquid-medium ejection units 21 (21a and 21b) formed by opening two parts of the sidewall of the cylinder 24 are disposed.

When the mixture of the kneaded mixture 16 and the compounding material 19 passes through this liquid-medium ejection zone, its surrounding switches from a closed system to an open system, which reduces the internal pressure of this mixture to the atmospheric pressure level and vaporizes the liquid medium contained in this mixture. Then, this vaporized liquid medium is separated from this mixture and ejected from the liquid-medium ejection unit 21.

These liquid-medium ejection units 21 are configured to cover the two openings formed on the sidewall of the cylinder 24 with mesh plates 27 so that this mixture does not squirt or leak from these openings to outside The vaporized gas of the liquid medium passes through these mesh plates 27 so as to be selectively ejected to outside.

Out of the plural liquid-medium ejection units 21 disposed along the longitudinal direction of the cylinder 24, upstream side of the liquid-medium ejection unit 21a is provided with a throttle valve 28.

By providing the throttle valve 28, the pressure of the internal space of the liquid-medium ejection unit 21a can be adjusted to an arbitrary value which is smaller than the internal pressure of the cylinder 24 but is larger than the atmospheric pressure.

By appropriately adjusting throttle amount of the throttle valve 28, rapid vaporization of the liquid medium can be prevented.

Further, in downstream side of the liquid-medium ejection unit 21b disposed at the downstream side, the mixture is exposed to the atmospheric pressure and the liquid medium is separated and ejected.

Although it is not illustrated, another liquid-medium ejection unit 21 provided with a depressurization pump may be further disposed at the further downstream side so that ejection of the liquid medium is promoted by setting the internal pressure of the cylinder 24 to a value lower than the atmospheric pressure.

The composite compound of the solid material 2 and the compounding material 19 from which the liquid medium is finally eliminated is taken out from the extraction unit 22 located at the end of the mixed dispersion unit 20.

The composite compound taken out from the extraction unit 22 is pelletized, then distributed in the market, and then melt again to be formed into various types of final products.

Figure 3:
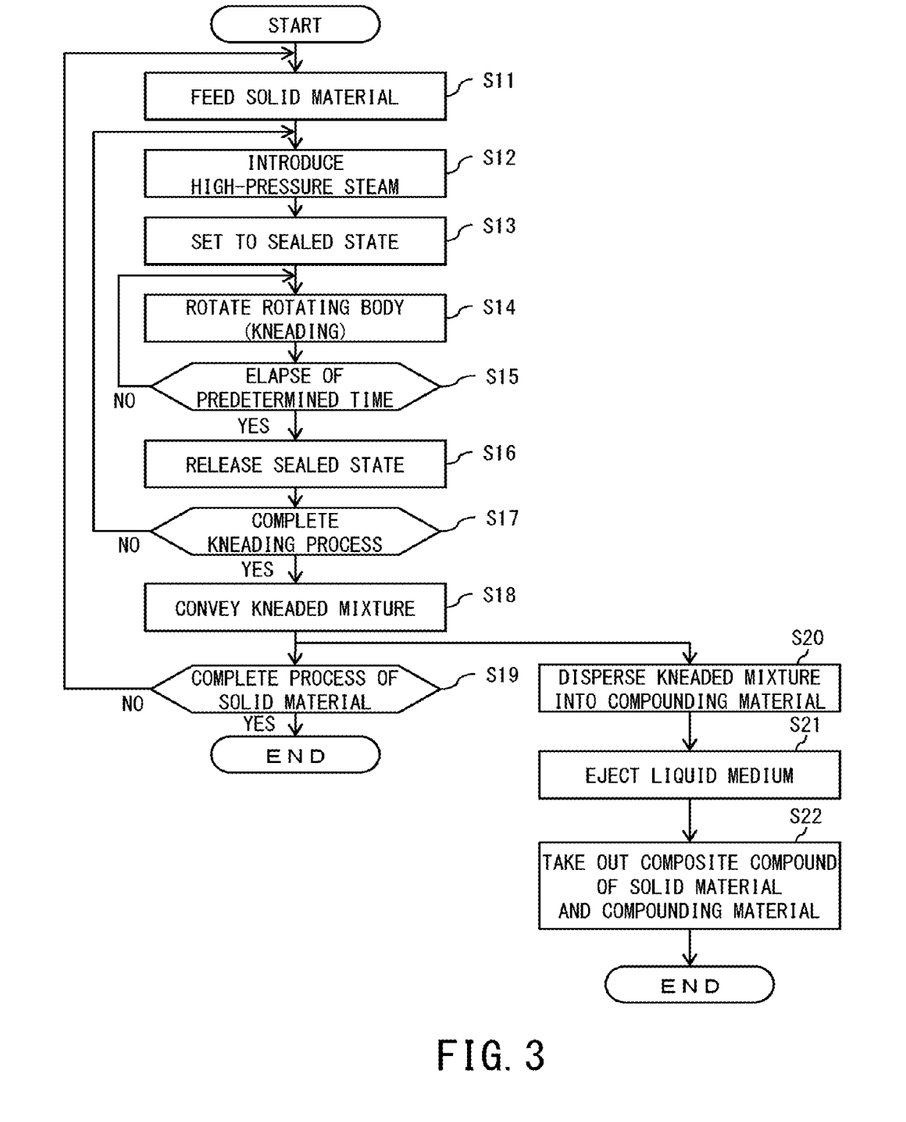
FIG. 3 is a flowchart illustrating a fine-dispersion compounding method according to an embodiment of the present invention.

Next, an embodiment of a fine-dispersion compounding method will be described according to the step number in the flowchart shown in FIG. 3 by referring to FIG. 1 as required.

Woody biomass (i.e., solid material 2) is fed into inside of the closed container 11 in the step S11, and then the high-pressure steam 3 is introduced into inside of the closed container 11 in the step S12. Then, at the timing when predetermined amount of the high-pressure steam 3 is introduced, the closed container 11 is set to the closed state in the step S13.

In the next step S14, the rotating body 13 is rotated inside the closed container 11 so that the solid material 2 and the liquid medium generated from the condensed high-pressure steam 3 are kneaded.

Since a great amount of strong acid such as wood vinegar is extracted from the woody biomass in the beginning of the kneading process, at the timing when predetermined time elapses from the start of the kneading process (i.e., corresponding to Yes in the step S15), the first port 14a is switched to the open state and the closed state of the closed container 11 is released in the step S16. Thereby, steam containing corrosive gas is emitted to outside of the closed container 11 and the internal pressure of the closed container 11 returns to the atmospheric pressure level.

Afterward, the high-pressure steam 3 is introduced again in the step 12 corresponding to NO in the step S17, and the kneading process is resumed in the steps S13 and S14. Next, when the solid material 2 is finely dispersed and the kneading process is completed (i.e., corresponding to YES in the step S17), the taking-out port 15 is opened and the kneaded mixture is conveyed from inside of the taking-out port 15 to outside in the step S18.

Then, the solid material 2 as the next processing target is fed into inside of the closed container 11 in the step 11 corresponding to NO in the step S19, and the processes from the steps S11 to S19 are repeated in this manner. When all the solid materials 2 as the processing targets are kneaded and finely dispersed, the fine-dispersing process is completed (corresponding to YES in the Step S19).

Meanwhile, the kneaded mixture containing the finely dispersed solid material 2 and the liquid medium is mixed with the compounding material 19 in the mixed dispersion unit 20 to be subjected to the dispersion process in the step S20.

Then, at the timing when the finely dispersed solid material 2 is homogeneously dispersed into the compounding material 19, the liquid medium is ejected from the liquid-medium ejection units 21 to outside of the mixed dispersion unit 20 in the step S21.

And then, the composite compound of the compounding material 19 and the solid material 2 from which the liquid medium is eliminated is taken out from the extraction unit 22 in the step S22, which completes the fine-dispersion compounding method.

According to at least one of embodiments of the fine-dispersion compounding apparatus and the fine-dispersion compounding method, by kneading solid material with high-pressure steam, energy and a solvent to be used can be reduced and aggregated structure of the solid material can be degraded while suppressing reduction in molecular mass of the solid material.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A fine-dispersion compounding apparatus comprising:
a closed container into which biomass is fed as solid material;
a boiler configured to introduce high-pressure steam into inside of the closed container;
a rotating body configured to
  (a) rotate inside the closed container,
  (b) knead the solid material with liquid medium generated from the high-pressure steam being condensed, and
  (c) degrade aggregated structure of the solid material by plasticizing action resulting from latent heat of the high-pressure steam and kinetic energy of rotation thereof;
open ports configured to
  (a) include a first port emitting steam containing corrosive gas generated by being separated from the solid material in a beginning of a kneading process to outside of the closed container and a second port emitting steam, whose concentration of corrosive gas is reduced from steam emitted from the first port, to outside of the closed container by being switched from the first port, and
  (b) set internal pressure of the closed container to atmospheric pressure level by releasing a closed state of the closed container;
a conveying port configured to convey kneaded mixture of the solid material and the liquid medium from inside to outside of the closed container;
a first retaining unit configured to retain the kneaded mixture conveyed from inside to outside of the closed container;
a second retaining unit configured to retain compounding material to be compounded with the kneaded mixture;
a mixed dispersion unit configured to
  (a) include a cylinder capable of setting temperature of an inner periphery thereof and a screw rotating inside of the cylinder, and
  (b) disperse the kneaded mixture and the compounding material into each other while extruding the kneaded mixture and the compounding material in one direction under preset temperature at which the compounding material is fluidized in a closed condition;
a liquid-medium ejection unit configured to
  (a) communicate a closed inside of the cylinder with outside of the cylinder whose pressure is set to a value lower than pressure of the closed inside, and
  (b) eject the liquid medium contained in the kneaded mixture to outside; and
an extraction unit configured to extract a composite compound of the solid material forming a dispersing phase by losing the liquid medium and being finely dispersed and the compounding material forming a matrix phase by being fluidized, to outside of the mixed dispersion unit.

2. The fine-dispersion compounding apparatus according to claim 1,
wherein the rotating body includes
(a) a shaft configured to rotate inside of the rotating body,
(b) at least three rods configured to extend in a direction perpendicular to an axial direction of the shaft, wherein one end of each of the at least three rods is disposed on the shaft, and
(c) at least three fins, each of which is provided on another end of each of the at least three rods, wherein a principal surface of each of the at least three fins has a torsional angle of 40° to 60° with respect to the axial direction of the shaft.

3. The fine-dispersion compounding apparatus according to claim 1,
wherein the boiler is configured to be capable of supplying 50 kg or more of water vapor, whose pressure per 1 m³ is 1.5 MPa or more, per hour.

4. A fine-dispersion compounding method comprising:
feeding solid material which is biomass into inside of a closed container;
introducing high-pressure steam into inside of the closed container;
rotating a rotating body inside the closed container, in such a manner that the solid material is kneaded with a liquid medium generated from the high-pressure steam being condensed and aggregated structure of the solid material is degraded by plasticizing action resulting from latent heat of the high-pressure steam and kinetic energy of rotation of the rotating body;
emitting steam, which contains corrosive gas generated by being separated from the solid material in a beginning of a kneading process, from a first port to outside of the closed container;
emitting steam, whose concentration of corrosive gas is reduced from steam emitted from the first port, from a second port to outside of the closed container by switching from the first port to the second port;
setting internal pressure of the closed container to atmospheric pressure level by releasing a closed state of the closed container;
conveying kneaded mixture of the solid material and the liquid medium from inside to outside of the closed container;
causing a first retaining unit to retain the kneaded mixture conveyed from inside to outside of the closed container;
causing a second retaining unit to retain compounding material to be compounded with the kneaded mixture;
dispersing the kneaded mixture and the compounding material into each other while extruding the kneaded mixture and the compounding material in one direction under preset temperature at which the compounding material is fluidized in a closed condition, in a mixed dispersion unit configured to include a cylinder capable of setting temperature of an inner periphery thereof and a screw rotating inside of the cylinder;
ejecting the liquid medium contained in the kneaded mixture to outside from a liquid-medium ejection unit configured to communicate a closed inside of the cylinder with outside of the cylinder whose pressure is set to a value lower than pressure of closed inside of the cylinder; and
extracting a composite compound of the solid material forming a dispersing phase by losing the liquid medium and being finely dispersed and the compounding material forming a matrix phase by being fluidized, to outside of the mixed dispersion unit.

* * * * *